United States Patent [19]

Moranz

[11] Patent Number: 4,802,519

[45] Date of Patent: Feb. 7, 1989

[54] RUBBER TIRED ROLLER BEARING

[75] Inventor: Richard F. Moranz, Cleveland, Ohio

[73] Assignee: Kendale Industries, Valley View, Ohio

[21] Appl. No.: 59,573

[22] Filed: Jun. 8, 1987

[51] Int. Cl.⁴ .......................... B65G 13/00; B60B 5/00
[52] U.S. Cl. .................................... 152/325; 152/326; 193/37
[58] Field of Search ............... 152/323, 324, 325, 326, 152/327; 384/125; 193/37, 35 R, 35 B

[56] References Cited

U.S. PATENT DOCUMENTS

| | | | |
|---|---|---|---|
| 2,655,684 | 10/1953 | Robinson | 152/323 |
| 3,545,582 | 12/1970 | Kimmen | 193/37 |
| 3,895,844 | 7/1975 | Merbler | 193/37 |
| 4,168,771 | 9/1979 | Krivel | 152/326 |

Primary Examiner—James B. Marbert
Attorney, Agent, or Firm—Woodling, Krost & Rust

[57] ABSTRACT

A wheel for pallet conveyor systems. A roller bearing is provided with a flange about its perimeter; an elastic tire, with a groove matching the flange, may be snapped onto the bearing.

3 Claims, 1 Drawing Sheet

RUBBER TIRED ROLLER BEARING

This invention relates to wheel assemblies for conveyor systems. In particular, it relates to cushioned bearings for fixed shaft pallet conveyors.

BACKGROUND AND SUMMARY OF THE INVENTION

In one type of materials conveyor system, a series of rotatable wheels on shafts are arranged in fixed positions at varying distances between the source and the destination of the materials. The axis of rotation of each wheel is perpendicular to the direction of transport motion. If the wheels are arranged closely enough together by comparison to the dimensions of the transported goods, they may simply be placed upon the wheels nearest the source, from whence they can be pushed over the rolling wheels, from one wheel to the next, towards their destination. The wheel arrangement is better than having the whole shaft rotate because it minimizes the total area of bearing surfaces, permitting them to be more readily protected from contamination and lubricated. Commonly, housed ball bearings are utilized for this purpose. Where, as is usual, the goods are small in relation to the interwheel distance, they are loaded onto large flat pallets which ride between the goods and the roller wheels.

In order to reduce sidewise sliding of the pallets, avoid pallet injury, and reduce excessive noise, it is desired to cushion the bearings with rubber or similar material. More importantly, in inclined conveyor systems, where gravity provides the motive force, the hardness of the cushioning (as well as the number of wheels) is used to adjust transport speed to the desired rate. Such cushions or tires have been used by prior art bearings. In general, they have been either thermoplastic tires molded directly onto the bearings, or tires bonded securely onto the bearings by way of adhesive agents. But a tire can be expected to deteriorate in the course of use, and thus will often need replacing before the metal bearing which it cushions. This has presented a problem with prior art devices.

The bearing and tire of the present invention solve this problem by being so configured, with relation to each other, that the tire may be "snapped on" to the bearing by hand with only moderate exertion of axial (sidewise) force. Once snapped on to the tire, however, the bearing will not come off during use in the conveyor system. If it becomes necessary to replace the tire, it may be "snapped off" by applying axial force to the tire in one direction and a supporting axial force to the bearing hub in the other direction. This snapping off requires far greater forces than can be applied by hand or than can occur in the natural course of use. The tire may also be removed by cutting. A new tire is then merely snapped onto the bearing.

In addition to the benefits already discussed of cushioning the wheels, tires or cushions also decrease wear upon the bearings arising from shock or sudden impacts, wear upon the bearings and thus extend the lives of the bearings. The present invention takes advantage of this enhanced bearing life by making successive tire replacements practical.

Accordingly, it is an obejct of the present invention to provide an improved rotating bearing, and tire thereupon, which tire may be easily and quickly applied to the bearing.

Another object of the invention is to provide such a bearing and tire in which the tire may be easily replaced upon the bearing.

Other objects and a fuller understanding of the invention will appear from the claims herein and from the detailed description to follow of a preferred embodiment of the invention taken together with the Figures, in which FIG. 1 is an exploded view, taken partly in section, of the bearing and tire of a preferred embodiment of the invention, and FIG. 2 is a view, partly in section, of the same preferred embodiment assembled.

DETAILED DESCRIPTION OF A PREFERRED EMBODIMENT OF THE INVENTION

Figure 1:
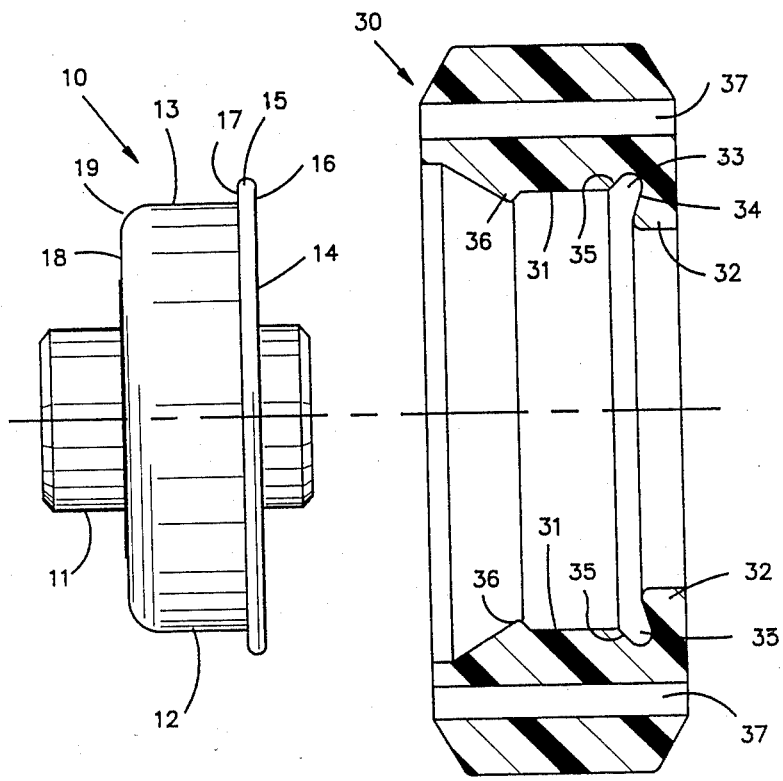

FIG. 1 shows a preferred embodiment of the invention, consisting of a bearing 10 and tire 30. Bearing 10 is preferably a typical wheel having a hub bearing member 11 suitable to be fixedly mounted on a shaft or axle, and an outer bearing member 12, generally toroidal, coaxial with the shaft and rotably fixed to hub bearing member 11. In the preferred embodiment the hub bearing member 11 is provided with an inner race, and the outer bearing member 12 with the outer race, of a ball bearing system; such system is not a part of the invention and is not shown.

Encircling the exterior of outer bearing member 12 is a generally cylindrical perimeter wall 13. Perimeter wall 13 is bounded at one end by a first end wall 14 and bearing flange 15 lying between perimeter wall 13 and first end wall 14. Bearing flange 15 has a first flange wall 16 extending to first end wall 14 and a second flange wall 17 extending to and perpendicularly meeting perimeter wall 13.

At the other end of perimeter wall 13 is a second end wall 18 which is separated from perimeter wall 13 by a shoulder 19.

Figure 2:
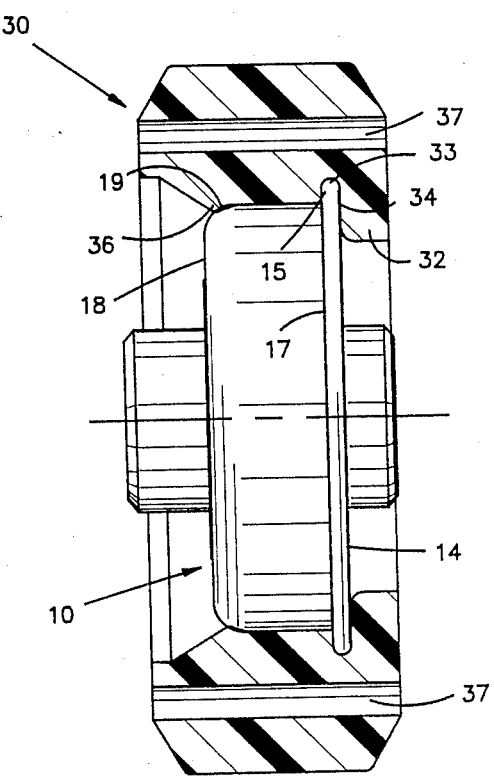

The tire 30 has a generally cylindrical inner perimeter wall 31, which, when the bearing is disassembled, is slightly smaller in radius than the radius of perimeter wall 13 of outer bearing member 12, so that there is an elastic interference fit between tire 30 and outer bearing member 12. On one end of inner perimeter wall 31 are a first tire flange 32 and tire groove 33. First tire flange 32 is shaped so as to encircle and overlap the outer portion of first end wall 14 of outer bearing member 12. Tire groove 33, and its first and second groove walls 34 and 35, respectively, closely accommodate bearing flange 15 when the bearing 10 and tire 30 are assembled, as shown in FIG. 2, while first tire flange 32 extends radially over a substantial portion of first end wall 14.

Because of the overlapping interference of tire flange 32 with first flange wall 16 and first end wall 14, tire 30 cannot be pushed axially off bearing 10 in one direction after being snapped on. In a similar fashion, second groove wall 35 and second flange wall 17 interfere so that tire 30 cannot be easily removed from bearing 10 by pushing in the other direction.

For many applications, the combinations of bearing flange 15, first tire flange 32 and tire groove 33, all dimensioned so that outer bearing member 12 is firmly held in tire 30, will suffice to assure that tire 30 will not be dislodged from bearing 10 in use. However it is preferred also to provide a second tire flange 36 at the remaining end of inner perimeter wall 31. Second tire flange 36 extends radially for a short distance over shoulder 19 and further acts to retain bearing 10 in tire 30 by its elastic fit around part of shoulder 19.

In the preferred embodiment, bearing flange 15 is located where first end wall 14 meets perimeter wall 13 of outer bearing member 12. This makes manufacture more economical and convenient. However, it will readily be appreciated that a similar flange could be located around any portion of perimeter wall 13 between its ends, with a relocation of tire groove 33 to correspond to its position.

It will be clear to those skilled in the art that the specific dimensions of the described features of tire 30 will be chosen according to the corresponding outer dimensions of outer bearing member 12 and the elasticity of tire 30. For example, the tire 30 of the preferred embodiment is an injection moldable elastomer of Shore A durometer hardness 60-85, the higher values of hardness giving the faster transport. Its inner diameter at first tire flange 32 is 1.115 to 1.135"; at tire groove 33, 1,500 to 1.490"; at inner perimeter wall 31, 1.340 to 1.330"; and at second tire flange 36, 1.224 to 1.244". Outer bearing member 12 has an outer diameter at its perimeter wall 13 of 1.385 to 1.380" and 1.510 to 1.500" at its bearing flange 15. In general, the same elastic interferences (0.010 inch groove diameter, 0.040-0.050 inch wall diameter) are suitable for wheels of any comparable size as used in conveyor systems; one skiled in the art will adjust the interferences proportionally for other sizes.

The tire 30 is preferably provided with axially extending holes 37, evenly spaced in a circle about its entire circumference. These holes reduce the cure cycle of the elastomer, reduce the tire weight, and adjust the springiness of the tire, which is an important factor in speed of transport. With such holes, harder elastomers may be used than might otherwise be desirable, and it is easier to achieve an effective compromise between ability of the tire to be snapped on and resistance to being removed. The holes 37 are preferably somewhat tapered, being smaller at one end for ease of unmolding.

The wheels of the present invention will prove to be useful in many other applications, for example, skate wheel conveyors, in which pallets are not used. They are also suitable as wheels for carts and other rolling devices subject to extraordinary wear and tear, or used in environments where noise reduction is desired.

The invention has been described in detail with particular emphasis on the preferred embodiments thereof, but it should be understood that variations and modifications with the spirit and scope of the invention may occur to those skilled in the art to which the invention pertains.

What is claimed is:

1. A wheel assembly comprising
   a hub adapted to be affixed to a shaft;
   an outer bearing member rotably affixed to said hub, said outer bearing member having a generally cylindrical outer perimeter wall, having a bearing flange, having a first end wall at a first end of said outer perimeter wall, and having a shoulder at a second end of said outer perimeter wall; and
   a generally toroidal resilient tire, said tire having an inner perimeter wall fitting elastically around said outer perimeter wall of said outer bearing member, having a tire groove, and having a tire flange at a first end of said inner perimeter wall, said tire groove fitting elastically around said bearing flange of said outer bearing member and said tire flange overlapping said first end wall of said outer bearing member.

2. The wheel assembly of claim 1 and in which said tire is further provided at a second end of said inner perimeter wall with a second tire flange fitting elastically around at least a portion of said shoulder.

3. The wheel assembly of claim 1 and in which said tire is provided with a plurality of axially extendig holes.

* * * * *